CARL F. SWINEHART, INVENTOR.

United States Patent Office 3,320,180
Patented May 16, 1967

3,320,180
THERMOLUMINESCENT DOUBLY DOPED LiF PHOSPHOR
Carl F. Swinehart, University Heights, Ohio, assignor, by mesne assignments, to Kewanee Oil Company, Bryn Mawr, Pa., a corporation of Delaware
Filed Nov. 7, 1963, Ser. No. 322,248
6 Claims. (Cl. 252—301.4)

This invention relates generally to thermoluminescent materials particularly adaptable for use in detecting and measuring radiation exposure. More particularly, the invention relates to the preparation of new crystalline lithium fluoride compositions having excellent thermoluminescent properties.

With the advent of radiation dosimetry, numerous methods and materials have been investigated for detecting and/or measuring radiation exposure of both inanimate objects and living beings to X-rays, gamma rays, neutrons and the like.

One group of materials which have proved to be especially useful in measuring and evaluating radiation quantitatively are the crystalline minerals and salts which are capable of thermoluminescence. Such substances, when exposed to X-rays or radioactivity and then heated, exhibit a luminescence capable of being measured quantitatively with a photomultiplier or any other suitable means for measuring integrated light output or intensity. See U.S. Patents to Daniels 2,616,051.

The mechanism of thermoluminescence is still imperfectly understood, but it is believed to be as follows. Impurity atoms or other crystal lattice defects provide metastable electron states several electron volts above the ground state. Some of the electrons freed from the ground state by ionizing radiation become trapped in these states. Later when the crystal is heated to a sufficient temperature, thermal excitation dislodges electrons from the traps, and they return to the ground state, radiating light in the visible and near-visible spectrum. The traps generally fall into several groups, each group releasing its electrons at a different temperature. The temperatures of release are characteristic of the type of crystal and the impurities.

One particular thermoluminescent material thoroughly investigated for detecting and measuring radiation is crystalline lithium fluoride. Lithium fluoride is of considerable interest because it nearly approximates the radiation cross-section of the human body—it has a tissue equivalent of nearly unity—and because its sensitivity to radiation is substantially independent of photon energy, responding almost linearly to energy absorbed at different wave lengths of radiation.

These properties make lithium fluoride peculiarly adaptable for use in measuring quantitatively the integrated amount of radiation received by living tissue upon exposure to X-rays or gamma rays.

Where body tissue is to be irradiated for therapeutic reasons, it is paramount that the actual dosage the body is receiving be known very accurately. A convenient method of monitoring radiation received by the body includes placing a thermoluminescent material proximate the tissue being radiated, continually removing small portions of the material and heating the material. The number of electrons excited and trapped is proportional to the amount of absorbed radiation. When the sample is heated, the amount of light given off is thus a measure of the radiation dose.

The use of thermoluminescent materials for measuring and evaluating amounts of radiation in the treatment of living tissue has not been as extensive, however, as their original discovery promised. Lithium fluoride being the most desirable because of its radiation cross-section has monopolized the work done in this field. However, because of the limited and inconsistent degree of thermoluminescence exhibited by lithium fluoride, it has not been accepted entirely as a practical dosimeter for measuring body tissue radiation.

Some effort has been made to determine if certain impurities contained in the lithium fluoride may be responsible for thermoluminescent activity of certain samples.

Synthetically produced crystalline lithium fluoride for optical application is seldom obtained with thermoluminescent characteristics. Most frequently, crystalline lithium fluoride is obtained as a material having good thermoluminescence below room temperature, after irradiation at liquid nitrogen temperatures, with little or no luminescence at elevated temperatures (150° C. to about 350° C.).

Analysis of some lithium fluoride having activity above room temperature was shown to contain titanium; but when titanium was added to pure lithium fluoride and the resulting composition fused and solidified, only an inactive composition resulted. Magnesium has also been found in active lithium fluoride but only an inactive material is obtained from pure lithium fluoride and magnesium fluoride.

The present invention is based on the discovery that a crystal of lithium fluoride grown under controlled conditions from a melt comprising predominantly lithium fluoride with an activator system consisting of at least on member of a first group consisting of magnesium, calcium and barium and at least one member of a second group consisting of aluminum, titanium and europium exhibit a much higher level of thermoluminescence above room temperature than any previous known crystals.

The present invention is carried out advantageously by fusing the lithium fluoride with the components of the activator system in a crucible while maintaining the system under a vacuum or an inert atmosphere. The crucible is contained in a furnace designed to grow crystals according to the Kyropoulos-Czochralski procedure set forth in Z. Phys. Chem., 92, 219 (1917), or the Stockbarger-Bridgman procedure set forth in U.S. Patents 2,149,076 and 2,214,976.

The resulting crystalline mass is then pulverified to the desired particle size (80–200 mesh Tyler) and preferably annealed at about 400° C. A subsequent annealing, after exposure to the radiation to be evaluated, at about 80° C. reduces lower temperature thermoluminescent responses that change rapidly with time leaving a permanent thermoluminescent response proportional to the incident radiation.

It is quite surprising and unexpected that the thermoluminescent lithium fluoride materials prepared according to the present invention are so responsive to X-rays, gamma rays and neutrons in view of the fact that lithium fluoride is not thermoluminescent by itself. Moreover, lithium fluoride "doped" with the identical ingredients as are used to prepare the materials of the present invention manifest a low level of thermoluminescence when merely fused and allowed to solidify in an uncontrolled manner— as for example, in casting the material.

The amounts of the activator materials or ions which may be used advantageously with the lithium fluoride appear to be governed by the ability of the lithium fluoride to take up the activator ions into the crystalline lattice. The members of the first group (magnesium, calcium and barium), advantageously are added to the lithium fluoride as the fluorides in amounts ranging from about 40 p.p.m. to about 400 p.p.m. (parts as the fluoride per million parts of lithium fluoride). Amounts less than 40 p.p.m. appear to have only a marginal effect, if any, while amounts of the members of the first group in excess of 400 p.p.m. appear to offer no improvement in the thermoluminescent characteristics of the lithium fluoride.

The members of the second group (aluminum, europium and titanium) appear to be more difficult to actively combine with the crystalline lithium fluoride than the members of the first group.

These activator materials or ions also may be employed as their fluorides. However, aluminum and titanium are employed more advantageously as their lithium derivatives, the cryolite ($Li_3AlF_6$) and the fluotitanate ($Li_2TiF_6$) respectively. Both the aluminum compound (e.g. the lithium cryolite or fluoride) and the europium compound (e.g. the fluoride) may be used advantageously in amounts up to 200 p.p.m. while the titanium compound appears to be harmful when used in amounts in excess of 60 p.p.m. The titanium when employed as the fluotitanate is preferably used in amounts ranging from about 42 p.p.m. to about 55 p.p.m.

The reasons for the harmful effect incurred from excessive amounts of titanium are not completely understood, but it is thought that titanium is easily reduced to the blue trivalent state under the conditions (high temperature plus vacuum or inert atmosphere) used in preparing the thermoluminescent materials of the present invention. When the crystalline lithium fluoride is prepared in air or other oxidizing atmosphere, excessive amounts of titanium (200–500 p.p.m.) may be used; but though the resulting material has good thermoluminescent characteristics, the response is undesirably high for the more transient responses near 100° C.

It has been found that the titanium may be combined advantageously with the aluminum to prepare a preferred class of materials. Still more preferred is the use of magnesium as the first group member with the aluminum and titanium.

Thermoluminescent characteristics of the materials of the present invention are more graphically illustrated in the accompanying drawings wherein.

Figure 1:
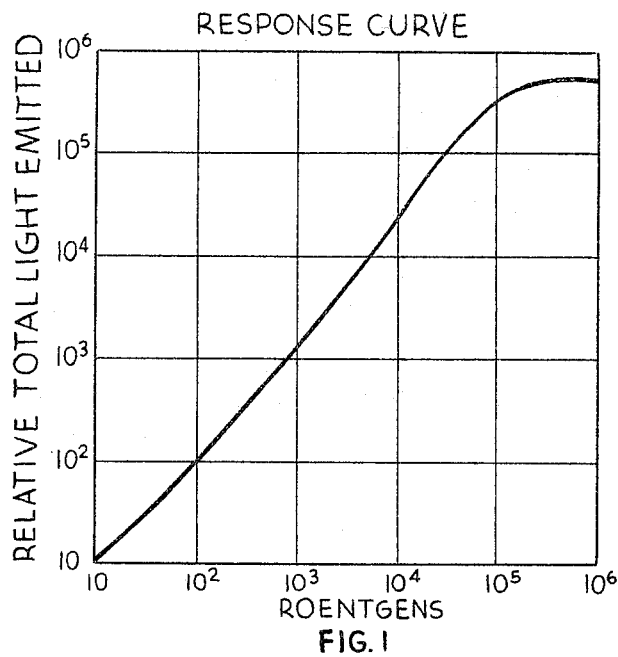
FIG. 1 is a graph plotting the light emitted versus radiation exposures in roentgens and the sensitivity or a response versus exposure in roentgens.

In order that those skilled in the art may better understand how the present invention can be carried into effect, the following examples are given by way of illustration and not by way of limitation. All parts and percentages are by weight unless otherwise stated.

Example I

Materials: Parts by weight
- Lithium fluoride _____ 1,000,000
- Magnesium fluoride _____ 400
- Lithium cryolite ($Li_3AlF_6$) _____ 200
- Lithium fluotitanate ($Li_2TiF_6$) ___ 55 ($13TiO_2$)

The above ingredients are mixed and charged into a graphite crucible with a lid vented to permit a minimum escape of the reactants and placed in a furnace of the Stockbarger-Bridgman type as described in the above patents. Heat is applied to the crucible to fuse the ingredients thereby forming a melt therein. After the entire mixture has fused and a homogeneous melt formed, the crucible is lowered slowly at a controlled rate into a zone having a temperature below the fusion point of the melt while maintaining the temperature of the upper zone above the fusion point of the melt. The crucible preferably is lowered into said zone at a rate less than 15 mm. per hour. Rates faster than 15 mm. per hour may be used also.

After the crucible has been lowered into the zone and the entire melt solidified with diminishing power, the furnace is allowed to cool to room temperature at 10° C. to 50° C. per hour. During growth and cooling, the furnace is maintained under a vacuum reading not over .01 mm. Hg absolute.

The contents are removed from the crucible pulverized and screen clarified to a particle size range of 80–200 mesh and annealed at 400° C. for approximately 1½ hours.

The thermoluminescent powders of the present invention are prepared according to the above outlined procedure using the materials and the proportions set forth in the following Table I. Lithium fluoride and the other ingredient used in these examples and Example I preferably are of at least analytical reagent grade or are prepared from analytical grade materials meeting ACS specifications, e.g. lithium fluoride prepared from lithium carbonate A.R. (ACS) and hydrofluoric acid 48 percent A.R. (ACS). Lower purity commercial grade materials may be used also but preferably should contain little if any chromium, cobalt, thallium, and/or bismuth. The materials are based on 1,000,00 parts by weight of lithium fluoride:

TABLE I

| Examples | II | III | IV | V | VI | VII | VIII | IX | X | XI | XII | XIII |
|---|---|---|---|---|---|---|---|---|---|---|---|---|
| Materials: | | | | | | | | | | | | |
| Magnesium fluoride | | | 400 | 400 | 40 | | | 200 | 400 | | | 40 |
| Barium fluoride | | 400 | | | | 40 | | | | | 300 | 80 |
| Calcium fluoride | 400 | | | | | | 40 | | | 300 | | |
| Lithium cryolite ($Li_3AlF_6$) | 200 | 200 | 200 | 200 | 20 | 60 | 50 | 100 | 30 | 100 | 20 | 200 |
| Lithium fluotitanate ($Li_2TiF_6$) | 55 | 55 | | 55 | 42 | | 50 | 60 | 55 | | 42 | 42 |
| Europium fluoride | | | 50 | 25 | | 50 | | | | 50 | | |

Each of the above samples is then tested for radiation luminescence by submitting each sample to a specific dose of gamma radiation (usually 100 r.) having an energy level of about 300 kev. After radiation the thermoluminescence of each sample together with samples of a reference preparation similarly irradiated was measured using a reading system analogous to the "Research Reader" described in an article by G. N. Kenny et al., Rev. Sci. Ins., 34, No. 7, 769 (1963).

Using the same component materials as above but omitting the magnesium fluoride, a melt is prepared in the manner as outlined in Example I. After a powder has been prepared as in Example I, it is irradiated and tested as before for thermoluminescene. This sample manifests no thermoluminescence.

As a further refinement of the present invention, there is provided a cast lithium fluoride thermoluminescent material adaptable for use in thermoluminescent dosimetry. This material is prepared from preferred compositions comprising lithium fluoride, magnesium, aluminum and tetravalent titanium.

Certain combinations of compounds used to prepare the thermoluminescent materials of the present invention being novel are considered to be within the scope thereof. Compositions may be fused and solidified under conditions other than those described as being controlled. The resulting materials are not nearly so good as the materials which have been solidified under controlled grown conditions, but they do exhibit a certain amount of thermoluminescence and are considered to have utility as such. Broadly this preferred class of materials comprises lithium fluoride blended with magnesium salts, aluminum salts, and tetravalent titanium salts in the proportions previously indicated, fused and solidified as a crystalline mass.

The following example sets forth the preparation of a thermoluminescent material prepared by solidifying this preferred basic composition without the use of controlled grown conditions.

*Example A*

Materials:                                   Parts by weight
    Lithium fluoride _____  1,000,000
    Magnesium fluoride _____        400
    Lithium cryolite ($Li_3AlF_6$) _____        200
    Lithium fluotitanate ($Li_2TiF_6$) _____     55 ($13TiO_2$)

The above materials are blended, placed in a graphite crucible and fused under a vacuum. After a homogeneous melt of the materials has been obtained, the melt is allowed to cool to room temperature over a period of five hours.

The resultant solidified mass is then pulverized as before to an average particle size of 180 mesh. When tested in the manner outlined in Example I, this material was shown to have an integrated light output, ⅙ as sensitive as the materials prepared according to Example I.

The optimum mesh size used for the thermoluminescent materials of the present invention (80–200 mesh Tyler) was determined experimentally. Grains larger than 80 mesh become difficult to gauge by volume accurately. Grains smaller than 200 mesh are less efficient in terms of light output per gram. Experiments on varying grain sizes show that all grain sizes from 70 to 250 mesh give the same light per gram per layer. However, the light per gram decreases with the number of layers of crystals present. Since the finer powder will be deposited in more layers, for a fixed weight, it is less efficient in net light yield.

Thermoluminescent materials of the present invention advantageously are employed as a dosimeter having the useful range from $10–10^5$ roentgens with an accuracy of better than 5 percent. That materials are reusable and since they preferably may be used as a loose crystalline powder, the materials allow for considerable versatility.

At 30 kev., the effective response is only 25 percent greater than at 1.2 mev. The stored thermoluminescence decays less than 5 percent per year and is unaffected by visible light, moisture or mechanical handling, other than forceful grinding.

Figure 2:
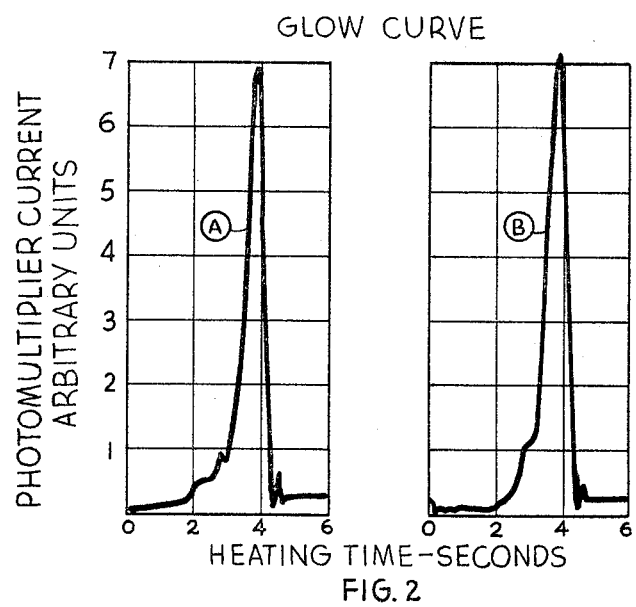
FIG. 2 is a graph showing the amount of light emitted from a sample exposed to a radiation of 102 roentgens before and after annealing at 100° C. for 10 minutes versus the time at 350° C.

FIG. 1 shows the light emitted versus roentgens and the sensitivity versus roentgens. Sensitivity is measured in units of light emitted per gram per roentgen normalized to 1.0 at ten roentgens. The sensitivity increases linearly within 1 percent from 10 to 2,000 roentgens. FIG. 2 shows glow curves of the material prepared according to Example I at various doses before (curve A) and after (curve B) annealing at 100° C. for 10 minutes. The glow curves are from exposures of 102 roentgens.

Saturation effects place an upper limit on the range of the dosimeter at around 100,000 roentgens, though the shape of the glow curve does change above this value and can be used for qualitative measurements to beyond two million roentgens. The lower range of the dosimeter is limited by the photomultiplier tube dark current when exposed to the hot sample and by non-radiation induced thermoluminescence which can give an amount of light comparable to 1 roentgen when lithium fluoride is used in the form of loose powder.

The physical interpretation of the spectrum of the emitted light is uncertain with respect to temperature of emission and intensity of irradiation. Nevertheless the integral spectrum was measured with photographic plates on a spectograph. Results from these measurements and from narrow band pass filters over the photomultipler tube are in qualitative agreement. Nearly all of the light emitted is between 3,800 angstroms and 5,500 angstroms with no marked structure in the spectrum. No significant differences were observed in the spectra as peaks with time or rate of heating.

For thermal neutrons, the reaction $Li(n,OC)H^3$ has a very large capture cross section, about 950 barns. The reaction products have a total energy of 4.8 mev. and are densely ionizing. As a result of this, the thermoluminescent sensitivity of $Li_6F$ to thermal neutrons is very high. If gamma rays are present as well as thermal neutrons, it is possible to measure the dose from each by irradiating a sample of $Li_6F$ and a sample of lithium fluoride made from pure $Li^7$. Lithium fluoride of the present invention when made with lithium-7 has less than 0.5 percent of the response to thermal neutrons of that made with lithium-6, so it essentially measures the dose from the gamma rays only. Since the lithium-6 fluoride responds to both gamma rays and thermal neutrons, its neutron component can be obtained by subtracting the gamma ray measurement obtained with lithium-7 fluoride. The amount of light from $10^9$ n/cm.$^2$ (about one rem.) of thermal neutrons equals the light from about 60 roentgens of gamma rays.

While specific examples of the invention have been set forth hereinabove, it is not intended that the invention b elimited solely thereto, but to include all of the variations and modifications falling within the scope of the appended claims.

What is claimed:

1. A thermoluminescent material consisting essentially of a crystal of lithium fluoride doped with activators composed of from about 40 to about 400 parts per million of at least one member of a first group consisting of magnesium, calcium, and barium, when such member is expressed as the fluoride, and at least one member of a second group consisting of aluminum, titanium, and europium, said member of said second group being used in an amount of 20 to 200 parts per million parts of lithium fluoride when said second group member is expressed as lithium cryolite or europium fluoride, and an amount of 20–60 parts per million parts of lithium fluoride when said second group member is expressed as lithium fluotitanate.

2. The thermoluminescent material of claim 1 wherein the member of said first group is magnesium and the member of said second group is titanium.

3. The thermoluminescent material of claim 2 wherein aluminum is included with titanium as a member of said second group.

4. A method of producing thermoluminescent lithium fluoride crystals which comprises providing a mixture of ingredients consisting essentially of lithium fluoride containing from about 40 to about 400 parts per million of at least one member of the group consisting of magnesium fluoride, calcium fluoride, and barium fluoride, and from about 20 to about 200 parts per million of a member of the group consisting of lithium cryolite, lithium fluotitanate, and europium fluoride, placing said mixture in a first one under a vacuum and above the temperature required to form a melt thereof, moving said melt at a controlled rate from said first zone into a second zone maintained below the fusion temperature of the melt while simultaneously applying heat in said first zone to maintain the temperature thereof, whereby said mixture continually solidifies as the heat is conducted through the continually formed solid crystalline mass as it moves into said second zone.

5. The method of claim 4 wherein said melt is moved into said second zone at a rate of from about 0.1 to 10 millimeters per hour.

6. A method of producing thermoluminescent lithium fluoride crystals which comprises providing a mixture of ingredients consisting essentially of lithium fluoride containing from about 40 to about 400 parts per million of magnesium fluoride, from about 20 to about 200 parts per million of lithium cryolite, and from about 40 to about 60 parts per million of lithium fluotitanate, placing said mixture in a first zone under a vacuum and above the temperature required to form a melt thereof, moving said melt at a controlled rate from said first zone into a second zone maintained below the fusion temperature of the melt, while simultaneously applying heat to said first zone to maintain the temperature thereof, whereby said mixture continually solidifies as the heat is conducted through the continually formed solid crystalline mass as it moves into said second zone.

References Cited by the Examiner

Friedman et al.: Radiosensitivity of Alkali Halide Crystals, Nucleonics, vol. 10, No. 6, June 1952, pages 24–29.

Kallman et al.: Scintillation Counting Techniques, Nucleonics, vol. 10, No. 9, September 1962, pages 15–17.

TOBIAS E. LEVOW, *Primary Examiner.*

R. D. EDMONDS, *Assistant Examiner.*

UNITED STATES PATENT OFFICE
CERTIFICATE OF CORRECTION

Patent No. 3,320,180              May 16, 1967

Carl F. Swinehart

It is certified that error appears in the above identified patent and that said Letters Patent are hereby corrected as shown below:

Column 6, line 3, "$Li(n,OC)H^3$" should read -- $Li^6(n,OC)H^3$ --; lines 7 and 10, "$Li_6F$", each occurrence, should read -- $Li^6F$ --; line 57, "one" should read -- zone --.

Signed and sealed this 7th day of April 1970.

(SEAL)
Attest:

Edward M. Fletcher, Jr.           WILLIAM E. SCHUYLER, JR.
Attesting Officer                Commissioner of Patents